US012687145B2

(12) United States Patent
Bartolo

(10) Patent No.: US 12,687,145 B2
(45) Date of Patent: Jul. 21, 2026

(54) RECIRCULATING HYDRO-PNEUMATIC IMPULSE TURBINE

(71) Applicant: Gravity Energy Pty Ltd, North Haven (AU)

(72) Inventor: Kevin Robert Bartolo, North Haven (AU)

(73) Assignee: Gravity Energy Pty Ltd, North Haven (AU)

( * ) Notice: Subject to any disclaimer, the term of this patent is extended or adjusted under 35 U.S.C. 154(b) by 0 days.

(21) Appl. No.: 18/842,170

(22) PCT Filed: Feb. 21, 2023

(86) PCT No.: PCT/AU2023/050114
§ 371 (c)(1),
(2) Date: Aug. 28, 2024

(87) PCT Pub. No.: WO2023/164740
PCT Pub. Date: Sep. 7, 2023

(65) Prior Publication Data

US 2025/0163880 A1 May 22, 2025

(30) Foreign Application Priority Data

Mar. 2, 2022 (AU) ................................ 2022900497

(51) Int. Cl.
*F03B 11/00* (2006.01)
*F03B 1/02* (2006.01)
*F03B 1/04* (2006.01)

(52) U.S. Cl.
CPC .............. *F03B 11/002* (2013.01); *F03B 1/02* (2013.01); *F03B 1/04* (2013.01); *F05B 2220/32* (2013.01);
(Continued)

(58) Field of Classification Search
CPC .. F03B 11/002; F03B 1/02; F03B 1/04; F03B 17/005; F03B 17/04; F03B 17/06;
(Continued)

(56) References Cited

U.S. PATENT DOCUMENTS 9,856,850 B1 * 1/2018 Sheehan ............... F03B 17/005
2014/0133961 A1 * 5/2014 Akbayir ................. F03B 17/00 415/80

(Continued)

FOREIGN PATENT DOCUMENTS

BR 202015029212 U2 * 5/2017
CH 713444 A2 8/2018

(Continued)

OTHER PUBLICATIONS

"Generally." Merriam-Webster.com Dictionary, Merriam-Webster, https://www.merriam-webster.com/dictionary/generally. Accessed Apr. 2, 2025. (Year: 2025).*

(Continued)

*Primary Examiner* — Ryan C Clark
(74) *Attorney, Agent, or Firm* — MARSHALL, GERSTEIN & BORUN LLP; Michael P. Furmanek

(57) ABSTRACT

A recirculating hydro-pneumatic impulse turbine including a collector assembly including a central draft tube extending therebelow, the collector assembly including a collector plate having a generally horizontal upper surface and being configured such that the draft tube is in fluid communication with the upper surface, there also being a series of peripherally arranged drive cups about the upper surface. The turbine also includes a drive assembly about the central draft tube, the drive assembly including a fluid inlet at its lower end in fluid communication with the lower end of the draft tube, and a plurality of tangentially arranged outlet nozzles configured at its upper end. The turbine also includes a
(Continued)

central air tube with an upper air inlet and a lower air distribution manifold, the manifold including at least one venturi outlet capable of entraining air in the fluid to assist movement of the fluid from the lower end of the drive assembly upwardly to the outlet nozzles. During use, fluid jets that form at the outlet nozzles engage with the drive cups to generate relative rotation between the outlet nozzles and the drive cups about a vertical axis, the relative rotation capable of providing useful work, with fluid subsequently flowing from the drive cups across the upper surface of the collector plate to the draft tube, down the draft tube where the fluid enters the fluid inlet of the drive assembly for entrainment with air and recirculation to the outlet nozzles.

29 Claims, 9 Drawing Sheets

(52) U.S. Cl.
CPC ... *F05B 2240/123* (2013.01); *F05B 2240/241* (2013.01)

(58) Field of Classification Search
CPC ................ F03B 17/062; F05B 2220/32; F05B 2240/123; F05B 2240/131; F05B 2240/133; F05B 2240/241; F05B 2240/2411
See application file for complete search history.

(56) References Cited

U.S. PATENT DOCUMENTS

| | | | |
|---|---|---|---|
| 2014/0191511 | A1 | 7/2014 | Markie et al. |
| 2019/0063396 | A1 | 2/2019 | Maynard |

FOREIGN PATENT DOCUMENTS

| | | | | | |
|---|---|---|---|---|---|
| KR | 20130040977 | A | * | 4/2013 | |
| WO | WO-2012/079171 | A1 | | 6/2012 | |
| WO | WO-2014/027970 | A1 | | 2/2014 | |
| WO | WO-2022248912 | A1 | * | 12/2022 | ............... F01D 1/32 |

OTHER PUBLICATIONS

International Search Report for Application No. PCT/AU2023/050114 mailed Apr. 24, 2023.
Written Opinion for Application No. PCT/AU2023/050114 mailed Apr. 24, 2023.

* cited by examiner

RECIRCULATING HYDRO-PNEUMATIC IMPULSE TURBINE

RELATED APPLICATION

This is the United States national phase of International Patent Application No. PCT/AU2023/050114, filed 21 Feb. 2023, which claims priority to Australian provisional patent application 2022900497, filed on 2 Mar. 2022, the entire contents of each of which are hereby incorporated herein by reference.

TECHNICAL FIELD OF THE INVENTION

The present invention relates to impulse turbines for converting hydraulic energy (amongst others) into mechanical or electrical energy, including the production of useful work from the kinetic energy of a flowing fluid, such as water, where the useful work might be useful for power generation or mechanical drive applications.

BACKGROUND OF THE INVENTION

Hydroelectric power generation generally harnesses single-pass flowing fluid, typically water held in a dam, and converts kinetic energy to generate electricity. Power output involves the product of vertical head and flow rate at a particular site, with the head producing water pressure—the greater the head, the greater the pressure to drive turbines, so more head or higher flow rate typically translates to more power.

By way of explanation, turbines are rotary mechanical devices that extract kinetic energy from a fluid flow and convert that energy into useful work, with hydraulic turbines being those that extract potential energy from a flowing liquid such as water. With this in mind, turbines are then often combined with generators to turn the useful work produced into, for example, electrical power.

Although hydraulic turbomachinery has seen widespread use for over a century, most conventional equipment is optimally suited for high head applications, where the available head might be in the order of 100 to 500 metres. However, many opportunities today for the generation of hydroelectric energy, especially those with reduced environmental impacts, will be at sites or in circumstances with less than 10 metres of head.

Turbines historically finding application at low head levels have included variations of propeller type turbines such as Archimedean screw turbines or progressive cavity devices such as waterwheels, in which a bucket delivers a quantity of water from an upper elevation to a lower elevation, and the water quanta moves at the same speed as the bucket. Consequentially, these types of devices operate slowly and must be very large in order to pass large quantities of water.

Propeller turbines and their derivatives, such as Kaplan turbines, can pass large quantities of water moving at high velocity across turbine blades, but these units often need to be installed at a relatively low elevation with respect to the water level downstream of the turbine, to prevent operating problems such as cavitation.

Consequentially, conventional turbines designed to produce power from low heads have typically been highly expensive, with extensive civil works necessitated by the operation requirements of the turbines, often introducing environmental concerns, and often requiring remote location away from most users of electricity. Accordingly, there remains a need for a simple, continuous duty turbine that is capable of operating efficiently under Very Low Head (VLH) conditions, especially at heads of 10 metres or less.

Before turning to a summary of the solution provided by the present invention, it should be appreciated that reference to any prior art in this specification is not, and should not be taken as, an acknowledgment or any form of suggestion that this prior art is either well known or forms part of the common general knowledge in any country.

Also, the following description will use directional terms such as downward and downwardly, upward and upwardly, lower and upper, and above and below, which will be used with reference to the impulse turbine of the invention when positioned for rotation about its vertical axis. Further, there will also be references to inner and outer, and inwardly and outwardly, which will be radial references, again made with respect to a centrally positioned vertical axis of rotation.

SUMMARY OF THE INVENTION

A skilled addressee will understand that impulse turbines are traditionally those in which a liquid flows, typically water and typically in large volumes and at high pressures (often due to the effects of gravity), to a static nozzle where a pressurised jet of liquid impacts onto drive cups (also referred to as buckets or blades) of a rotating wheel, such as a rotating wheel of the Pelton-type, with the rotation of that wheel then producing the required torque and work output.

In this respect, there will be some references made hereafter to a Pelton-type collector assembly and collector plate, which will be understood by a skilled addressee to be a general reference to a radial arrangement of drive cups similar in nature to that found on the rotating wheel of a Pelton-type impulse turbine. However, importantly, it must be appreciated that the broadest form of the invention is not be limited to Pelton-type arrangements where static nozzles interact with rotating drive cups. The Pelton-type arrangements envisaged to be relevant to the present invention include rotating nozzles interacting with static drive cups, and rotating nozzles interacting with rotating drive cups, there thus simply being relative rotation between nozzles and drive cups.

The present invention provides a recirculating hydro-pneumatic impulse turbine, the impulse turbine including:

a collector assembly including a central draft tube extending therebelow, the collector assembly including a collector plate having a generally horizontal upper surface and being configured such that the draft tube is in fluid communication with the upper surface, there also being a series of peripherally arranged drive cups about the upper surface;

a drive assembly about the central draft tube, the drive assembly including a fluid inlet at its lower end in fluid communication with the lower end of the draft tube, and a plurality of tangentially arranged outlet nozzles configured at its upper end;

a central air tube with an upper air inlet and a lower air distribution manifold, the manifold including at least one venturi outlet capable of entraining air in the fluid to assist movement of the fluid from the lower end of the drive assembly upwardly to the outlet nozzles, wherein, during use, fluid jets that form at the outlet nozzles engage with the drive cups to generate relative rotation between the outlet nozzles and the drive cups about a vertical axis, the relative rotation capable of providing useful work, with fluid subsequently flowing from the drive cups across the upper surface of the collector plate to the draft tube, down the draft tube where the fluid enters the fluid inlet of the drive assembly for entrainment with air and recirculation to the outlet nozzles.

The above recirculating hydro-pneumatic impulse turbine might be useful in a power generation system, the power generation system including the recirculating hydro-pneumatic impulse turbine, a turbine starter system, a turbine braking system and a generator, wherein:

the turbine starter is capable of initiating rotation of either the outlet nozzles alone or the outlet nozzles and the drive cups, when the turbine is primed with fluid, to generate the relative rotation, following which the turbine starter disengages, the braking system is capable of stopping the relative rotation; and the generator converts the useful work of the relative rotation to electrical energy.

In relation to such a power generation system, it will be appreciated that the turbine starter and the braking system may simply be traditional components used for these same purposes, suitably sized in terms of the system's power requirements, while the generator (again suitably sized) may simply be a normal type of generator traditionally used for similar purposes. In this respect, it will also be appreciated that in the power generation system, it may be ideal to additionally include some type of traditional speed regulation device, such as a parasitic speed regulation device of the type used in standard industrial drive systems.

The above recirculating hydro-pneumatic impulse turbine might also be useful in a mechanical drive system, the mechanical drive system including the recirculating hydro-pneumatic impulse turbine, a turbine starter system, a turbine braking system, and a mechanical drive converter, wherein:

the turbine starter is capable of initiating rotation of either the outlet nozzles alone or the outlet nozzles and the drive cups, when the turbine is primed with fluid, to generate the relative rotation, following which the turbine starter disengages, the braking system is capable of stopping the relative rotation; and the mechanical drive converter converts the useful work of the relative rotation to useful mechanical work.

In relation to this mechanical drive system, it will be appreciated that the turbine starter and the braking system may simply be traditional components used for these same purposes, while the mechanical drive converter may simply be any type of mechanism that is able to mechanically convert the rotation of the impulse turbine into rotation or movement of another mechanism such that another mechanism can benefit from the work generated by the impulse turbine. In this respect, it will also be appreciated that in the mechanical drive system, it may be ideal to additionally include some type of traditional speed regulation device, such as a parasitic speed regulation device of the type used in standard industrial drive systems.

In relation to the inclusion of a 'turbine starter' in these power generation and mechanical drive systems, which is capable of initiating the relative rotation and then disengaging, it will be appreciated that functional references will be made in much of the following description in relation to the configuration of various aspects of the impulse turbine of the present invention, with reference to a turbine starter having played its role in providing an initial energy input and there already being relative rotation of the kind mentioned above, with the impulse turbine thus generally then in an operating mode, utilising gravity as an ongoing energy input (as occurs in traditional hydroelectric power generators), Returning to a description of various features of the impulse turbine, as mentioned above, in the broadest form of the present invention, the fluid jets formed at the outlet nozzles engage with the drive cups to generate relative rotation therebetween, and it is this relative rotation that will be the source of the useful work. This reference to 'relative rotation' will be understood to include embodiments where the outlet nozzles rotate and interact with static drive cups, and also embodiments where the outlet nozzles rotate and the drive cups rotate in the opposite direction.

In all embodiments, however, the collector plate of the collector assembly has a generally horizontal upper surface and the rotation, regardless of which element rotates, will be rotation about a generally vertical axis. This is in contrast to traditional Pelton-type impulse turbines where the rotation of a Pelton-type wheel will typically occur about a horizontal axis.

With this in mind, the preferred form of relative rotation will be the embodiment where the outlet nozzles rotate and interact with static drive cups. In one embodiment, this is achieved by the collector assembly including a static upper drive plate, spaced above the collector plate, such that the drive cups are integral with or secured to the underside of the drive plate, arranged about the periphery thereof, to extend downwardly towards the collector plate to be immediately above, but not in contact with, the collector plate.

The drive cups may be integrally formed with the drive plate, such that drive plate and drive cups form a single element, or the drive cups may be removably or permanently attached to the drive plate by any suitable means, such as bolts or by welding.

In this embodiment, the collector plate will ideally be a floating plate, in that the collector plate will be mounted for rotation on bearings or the like but will not be driven for rotation. This floating function assists to dampen any energy remaining in fluid exiting the nozzles and moving across the upper surface of the collector plate, after the fluid's engagement with the drive cups. This assists with minimising any turbulence in that fluid and also minimise any subsequent interaction of that fluid with other drive cups, such as drive cups adjacent to or opposed to the drive cups that the fluid immediately interacts with when exiting the nozzles.

Also in this embodiment, the outlet nozzles of the drive assembly preferably lie outside the periphery of the collector plate and rotate about the periphery of the collector plate, with the drive plate configured to extend out beyond the periphery of the collector plate such that the drive cups also extend out beyond the periphery of the collector plate to permit fluid exiting the rotating nozzles to interact directly with the drive cups. As outlined above, that fluid then exits the drive cups, onto the upper surface of the floating collector plate, for flow thereacross towards and down the central draft tube.

In this form, the central draft tube is preferably integrally formed with the collector assembly, or at least with the collector plate, extending vertically therebelow such that the generally horizontal upper surface of the collector plate and the central draft tube together have a funnel-shaped configuration, and such that the draft tube is in fluid communication with the upper surface. Ideally then, fluid on the upper surface will flow by way of gravity from the upper surface to the centre of the collector plate and down the draft tube. It will thus be appreciated by a skilled addressee that the reference to the upper surface of the collector plate being 'generally horizontal' is a reference to the overall form of the upper surface, allowing for the presence of at least a slight inwardly directed incline of that surface to permit and direct flow of fluid off that surface towards and down the central draft tube.

The central draft tube may be a diverging, converging or constant diameter tube, with the preferred form being a constant diameter tube, albeit with a transitional region (a shoulder region) between the upper surface of the collector plate and an upper portion of the draft tube.

Additionally, because the general arrangement of the present invention sees the recirculating fluid coming from below the collector plate (in the form of the fluid jets that engage with the drive cups), with the fluid then moving across the upper surface of the collector plate after engaging with the drive cups, the drive cups preferably include at least a fluid-jet engaging portion that is the portion that extends outwardly beyond the periphery of the collector plate, together with a fluid return portion that returns fluid to the upper surface of the collector plate. In this form, with outlet nozzles positioned tangentially to the periphery of the collector plate and outside the periphery of the collector plate, fluid jets are able to first engage with the fluid-jet engaging portions of the drive cups, with the fluid then passing across the drive cups via the fluid return portions to be transferred to the upper surface of the collector plate.

In a preferred form, the drive cups are configured such that fluid jets are deflected through 160° to 170°, with the high velocity fluid jets impinging upon the fluid-jet engaging portions of the drive cups and the direction of the water changing to follow the contour of the drive cups. The impulse energy of the water exerts torque on the drive cups and thus provides the relative rotation between the drive cups and the outlet nozzles, in the preferred form making the outlet nozzles and the drive assembly rotate. As mentioned above, the fluid then changes direction and exits at the sides of the drive cups onto the collector plate with low velocity.

In relation to the drive assembly of the impulse turbine of the present invention, the drive assembly is preferably configured and arranged to be about the central draft tube, generally below the collector plate, with one or more fluid inlets at the lower end of the drive assembly, in fluid communication with the lower end of the draft tube where fluid exits the draft tube, and a plurality of tangentially arranged outlet nozzles configured at its upper end.

With this in mind, the drive assembly may for instance be a cylindrical drum, rotatable about its central, vertical axis, with the interior of its sidewall being a smooth surface, the sidewall being inclined away from the vertical axis of the drum, across which fluid from the drum's lower fluid inlet will flow to exit through a plurality of peripherally arranged outlet nozzles about the upper end of the drum. In this form, the drum's lower fluid inlet will be configured so as to guide the flow of fluid away from the lower fluid inlet, up the interior of the sidewall of the drum, preferably in a direction that is tangentially inclined to the sidewall of the drum.

Alternatively, the interior of the sidewall of the drum may be configured with open flow channels, such as corrugations or grooves, with the sidewall and thus these corrugations or grooves again preferably inclined from the vertical axis of the drum, and also tangentially inclined to the sidewall of the drum, each of which align with a specific outlet nozzle, to provide guided flow of the fluid from the lower fluid inlet of the drum to the upper outlet nozzles. In this form, the fluid inlet of the drum may include a lower fluid distribution manifold that distributes fluid from the fluid inlet to the lower end of each of the corrugations or grooves, again to provide guided flow of the fluid.

In yet another form, the open flow channels may be replaced by closed flow channels, either formed integrally with the interior of the side wall of the drum, or rigidly secured to the interior of the side wall of the drum, with the same vertical and tangential inclinations mentioned above.

Further still, the drive assembly may be provided without the need for a solid walled drum, where flow channels are provided in the form of a plurality of tubes, the tubes essentially forming a cage of tubes about the central draft tube, with each tube aligning with a specific upper outlet nozzle, to provide guided flow of the fluid from a lower fluid distribution manifold that distributes fluid from the central draft tube to the lower end of each of the tubes, again to provide guided flow of the fluid to respective upper outlet nozzles. Furthermore, such tubes will again preferably be configured so as to be vertically inclined from the vertical axis of the drive assembly (and thus of the collector assembly) and also tangentially inclined from the periphery of the collector plate in the same manner as outlined above, resulting in a generally helical array of tubes forming the cage-like drive assembly.

In these embodiments, although not essential, the fluid flow from the lower end of the drive assembly to the upper outlet nozzles of the drive assembly will ideally be upward and generally helical, due to the preferred dual inclinations away from the vertical axis of the collector assembly and tangentially to the periphery of the collector plate. These dual inclinations, as opposed to an embodiment with no such inclinations, assist with the movement of fluid from the lower end of the drive assembly upwardly to the outlet nozzles, with the fluid jets formed at the outlet nozzles engaging with the drive cups to generate the relative rotation referred to above between the drive cups and the outlet nozzles about the vertical axis, and it is this rotation that is capable of providing the useful work.

Returning to a description of the collector assembly, including the collector plate and the central draft tube, as mentioned above the collector plate includes a generally horizontal upper surface with the central draft tube extending vertically therebelow, the collector plate being configured such that the draft tube is in fluid communication with that upper surface. With fluid flowing from the drive cups across the upper surface of the collector plate to the draft tube, and down the draft tube, the fluid enters the fluid inlet of the drive assembly for entrainment with air and recirculation back upwardly to the outlet nozzles.

With this in mind, the central draft tube includes a central air tube with an upper air inlet and a lower air distribution manifold. Preferably, the lower air distribution manifold includes at least one venturi outlet capable of entraining air in the fluid to assist movement of the fluid from the lower end of the drive assembly upwardly to the upper outlet nozzles. Noting that there are several embodiments available for the drive assembly of the impulse turbine, particularly with regard to the presence or not of fluid flow structures (namely the open or closed flow channels that can be in the form of corrugations, grooves, integral tubes or standalone tubes), it will be appreciated that the lower air distribution manifold can itself take many forms as necessary. Ideally though, for the fluid inlet of the drive assembly, and for however many structures there might be for the preferred guided fluid flow upwardly in the drive assembly, for each such structure the lower air distribution manifold will include a respective venturi outlet capable of entraining air in the fluid to assist movement of the fluid from the lower end of the drive assembly upwardly to the outlet nozzles.

With respect to the flow of air into and through the impulse turbine of the present invention, firstly, air will be drawn down the central air tube from above the collector plate via the upper air inlet, which may be in the form of a plurality of suitably positioned inlet apertures, where air entrained in the circulating fluid (exiting the outlet nozzles and flowing across the upper surface of the collector plate) will be escaping. However, air will preferably also be drawn from an external air valve above the collector assembly such that air can be drawn from atmosphere. In this respect, such an external air valve can ideally be incorporated with an air release valve and is thus preferably a passive vent to allow internal and external air pressures to equalize, ideally designed to also minimise loss of fluid from the system.

In a preferred form, the central air tube includes a plurality of inlet apertures located at a level near or just below the level of the collector plate, such that the air entering the central air tube will travel downwardly from those apertures to the lower air distribution manifold. In this respect, in one form the lower air distribution manifold can include a series of radial ports (one for each venturi outlet), each being in fluid communication with a respective venturi tube. Such venturi tubes ideally extend from the central air tube wall to a location either associated with, and in close proximity to, an open flow channel such as a corrugation or groove, or to a location within a closed flow channel such as a tube, with its outlet facing downstream to the flow so as to create a venturi through which air is entrained into the passing fluid.

After exiting these venturi outlets, the air will be compressed in the fluid by centrifugal forces in the flow channels, with the air expanding after peak compression and on its exit from the flow channels so as to pressurise the fluid to increase the velocity of the fluid up the flow channels and form an adjustable velocity.

Minor mechanical friction losses will be associated with the drive assembly rotation, given that the drive assembly will ordinarily be supported by bearings at either end of its axis. Additionally, it will be appreciated that the contra rotating fluid circulating at maximum radius to the axis, contained within flow channels of the drive assembly, acts as a compressed fluid mass. While there will also be frictional losses associated with this fluid circulation, the contra rotation of the fluid compared to the rotation of the drive assembly is such that the normal downward gravitational forces exerted on the upwardly flowing fluid within the drive assembly is largely eliminated to the point where there is little resistance to the upward movement of the fluid.

Furthermore, as the fluid travels away from the point of peak compression, air entrained within the fluid begins expanding, and ejects the fluid from the outlet nozzles at a greater velocity than that of un-entrained fluid. In this form, this 'de-compressing' fluid exits the outlet nozzles and is impacted into the drive cups of the collector assembly and transfers the energy (thrust) from the fluid to the rotating drive assembly, therefore providing rotational drive to the entire drive assembly.

Under Very Low Head (VLH) conditions, such as operation at heads of less than 10 m, the impulse turbine of the present invention operates ideally (in terms of preferred rates of acceleration) with a head of less than 5 m and ideally in the range of 1 to 3 m. In this respect, as the energy gained by falling fluid beyond about 5 m is insignificant in the impulse turbine of the present invention, the range of 1 to 3 m of head for this configuration of turbine is ideal. Also, with the configurations of the present invention, the greater distance that the fluid falls, the greater the distance that the fluid must be returned upwardly to the collector assembly, such that efficiencies can be maximised in the range of 1 to 3 m without an unnecessary penalty being paid for gaining any extra head of fluid.

BRIEF DESCRIPTION OF DRAWINGS

Having briefly described the general concepts involved with the present invention, several preferred embodiments of a recirculating hydro-pneumatic impulse turbine will now be described that is in accordance with the present invention. However, it is to be understood that the following description is not to limit the generality of the above description.

In the drawings.

DETAILED DESCRIPTION OF PREFERRED EMBODIMENT

Figure 1A:
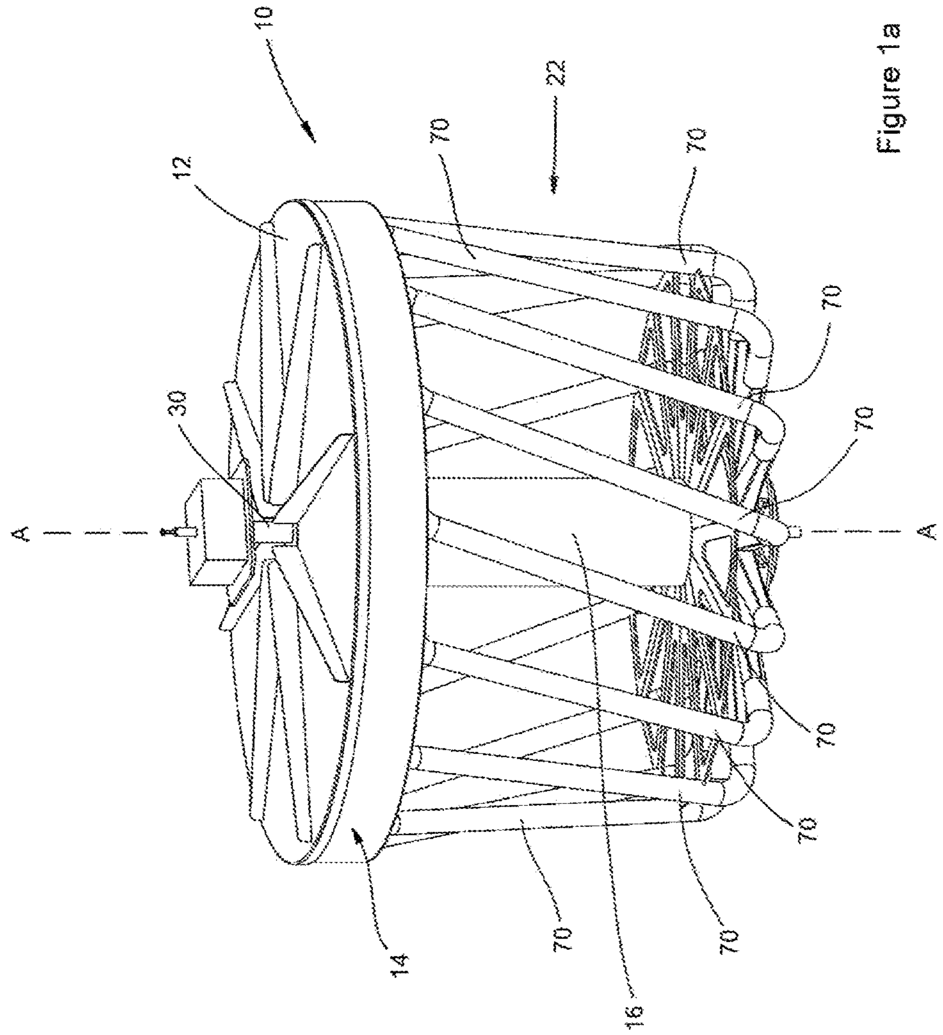
FIG. 1*a* is an isometric view from above of an impulse turbine in accordance with a first embodiment of the present invention, with FIGS. 1*b*, 1*c* and 1*d* being, respectively, an isometric view from below of the first embodiment as mounted in a supporting frame, an isometric and schematic view from above with the drive plate cover removed to show drive cups and the collector plate, and another isometric and schematic view from above with the drive plate cover and drive cups removed to show the outlet nozzles.
Figure 1B:
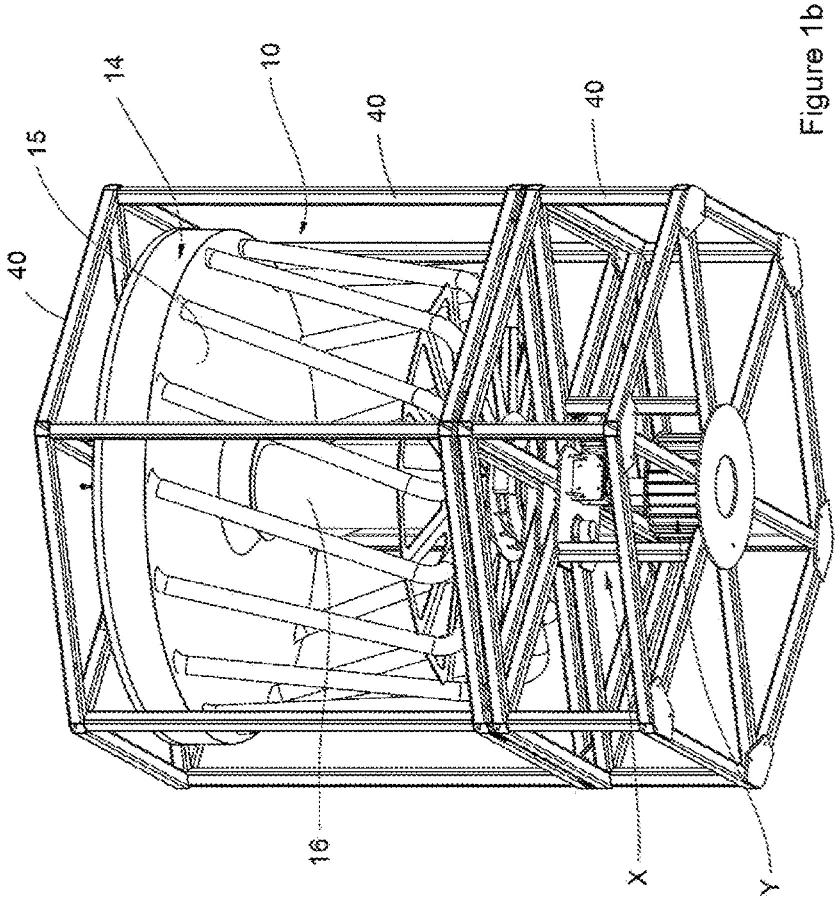

Illustrated in FIGS. 1*a* to 1*d* and FIGS. 3 to 5 is a recirculating hydro-pneumatic impulse turbine in accordance with a first preferred embodiment of the present invention. In this first embodiment, and before referencing specific items in the Figures with reference numerals, the impulse turbine of this embodiment generates relative rotation between its outlet nozzles and drive cups by virtue of the drive cups being static and the outlet nozzles rotating. Additionally, this first embodiment has a drive assembly with flow channels in the form of tubes, where multiple tubes are provided in the general form of a cage of tubes about the central draft tube of the collector assembly. The impulse turbines of the second and third embodiments illustrated in FIGS. 2*a* and 2*b* differ from the first embodiment in the type of flow channels that they incorporate in the drive assembly.

With specific reference to FIGS. 1*a* to 1*d*, illustrated is an impulse turbine 10 that includes a collector assembly (generally indicated by reference numeral 14), which in this embodiment includes a drive plate 12 above and spaced from, but in close proximity to, a collector plate 15, the collector plate 15 having a central draft tube 16 extending therebelow. The collector plate 15 includes a generally horizontal upper surface 18 and is configured such that the draft tube 16 is in fluid communication with the upper surface 18. A series of peripherally arranged drive cups 20 are evident in FIG. 1*c*, although these are shown schematically in FIG. 1*c* as they are ordinarily integral with or secured to the underside of the drive plate 12 which has been removed in FIGS. 1*c* and 1*d*. The normal relationship of the drive cups 20 to the drive plate 12 and collector plate 15 can be seen in FIG. 3. The drive cups 20 will be more specifically described below.

The impulse turbine 10 also includes a drive assembly 22 about the draft tube 16, the drive assembly 22 having a fluid inlet 24 (see FIGS. 3 to 5) at its lower end in fluid communication with the lower end of the draft tube 16, and a plurality of tangentially arranged outlet nozzles 26 configured at its upper end.

The impulse turbine also includes a central air tube 30 with an upper air inlet in the form of a plurality of inlet apertures 80 and a lower air distribution manifold 34, the manifold 34 (see FIGS. 3 to 5) including at least one venturi outlet 36 (see FIGS. 3 to 5) capable of entraining air in the fluid to assist movement of the fluid from the lower end of the drive assembly 22 upwardly to the outlet nozzles 26 of the drive assembly 22.

As mentioned more generally above, during use of the impulse turbine 10, fluid jets formed at the outlet nozzles 26 engage with the drive cups 20 to generate relative rotation between the outlet nozzles 26 and the drive cups 20 about a vertical axis A, the rotation capable of providing useful work, with fluid subsequently flowing from the drive cups 20 across the upper surface 18 of the collector plate 15 to the draft tube 16, down the draft tube 16 where the fluid enters the fluid inlet 24 of the drive assembly 22 for entrainment with air and recirculation to the outlet nozzles 26.

The impulse turbine 10 may be used in a power generation system or a mechanical drive system, in both situations utilising a turbine starter system, a turbine braking system and a generator or a mechanical drive converter. These systems and additional equipment are not generally shown in the Figures, although preferred locations for the equipment is illustrated generally at X and Y in FIG. 1*b* (and also at X and Y for the second and third embodiments shown in FIGS. 2*a* and 2*b*), where an impulse turbine 10 in accordance with the first embodiment is shown mounted in a suitable supporting cage 40 ready for installation.

In this respect, and as mentioned above, a turbine starter is capable of initiating rotation of the outlet nozzles 26 of the drive assembly 22 to prime the drive assembly 22 with fluid, to generate the relative rotation between the outlet nozzles 26 and the drive cups 20, after which gravity provides ongoing energy input (as occurs in traditional hydroelectric power generators), following which the turbine starter disengages. The braking system is capable of stopping that relative rotation when necessary. When used, a generator converts the useful work of the relative rotation between the drive cups 20 and outlet nozzles 26 to electrical energy and, when used, a mechanical drive converter converts the useful work of the relative rotation between the drive cups 20 and outlet nozzles 26 to useful mechanical work.

Figure 1C:
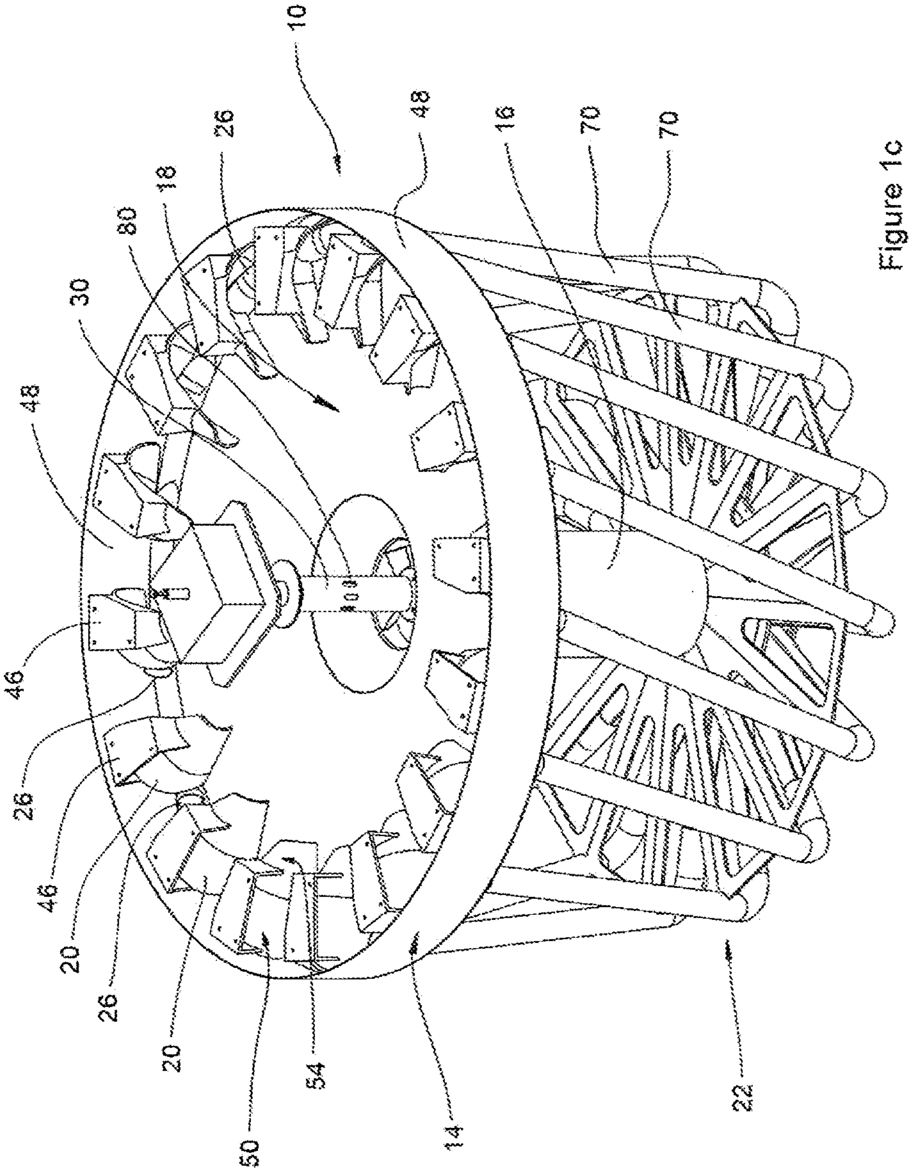
Figure 1D:
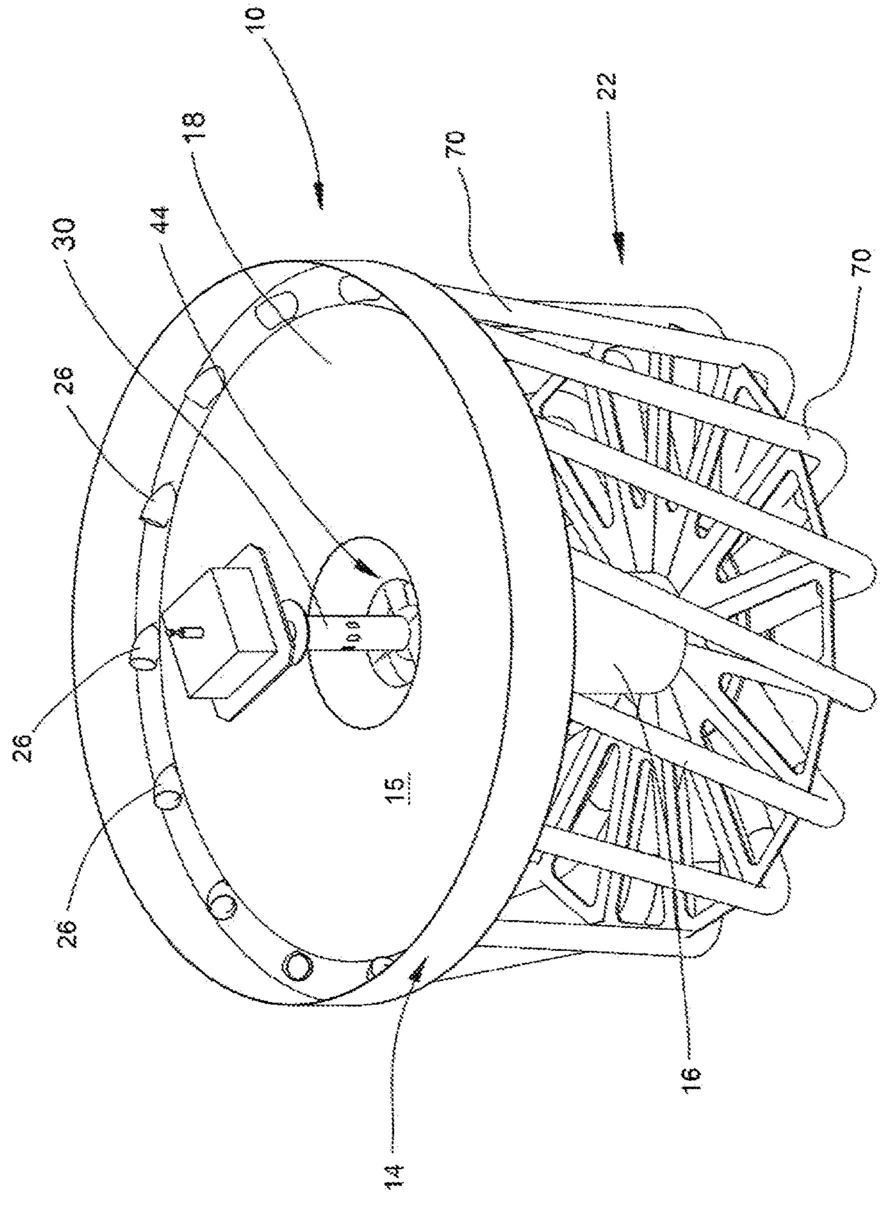

With reference to the schematic illustrations in FIGS. 1*c* and 1*d*, where some parts have been removed for ease of reference, the fluid jets (not shown) formed at the outlet nozzles 26 (best shown in FIG. 1*d*) of the impulse turbine 10 engage with the drive cups 20 (best shown in FIG. 1*c*) to generate relative rotation between the drive plate 12 of the collector assembly 14 and the outlet nozzles 26 of the drive assembly 22, and as mentioned above it is this relative rotation that is the source of the useful work. In this embodiment, the outlet nozzles 26 of the drive assembly 22, and thus the drive assembly 22 itself, rotate and interact with the drive cups 20 of the static drive plate 12.

The relative rotation is rotation about the vertical axis A. This is in contrast to traditional Pelton-type impulse turbines where the rotation of a Pelton-type wheel will typically occur about a horizontal axis.

The collector plate 15 is a floating plate, in that it is mounted for rotation on bearings (not shown) but is free and would normally not rotate, or at least would not rotate at anything near the speed of the drive assembly. As mentioned above, the floating function assists to dampen any energy remaining in fluid exiting the outlet nozzles 26 and moving across the upper surface 18 of the collector plate 15, after the fluid's engagement with the drive cups 20.

The outlet nozzles 26 lie outside the periphery 52 of the collector plate 15 (see FIG. 3) and thus rotate about the periphery of the collector plate 15, with the drive plate 12 configured to extend out beyond the periphery of the collector plate such that the drive cups 20 also extend out beyond the periphery of the collector plate 15 to permit fluid exiting the outlet nozzles 26 to interact directly with the drive cups 20. That fluid then exits the drive cups 20, onto the upper surface 18 of the floating collector plate 15, for flow thereacross towards and down the central draft tube.

Figure 3:
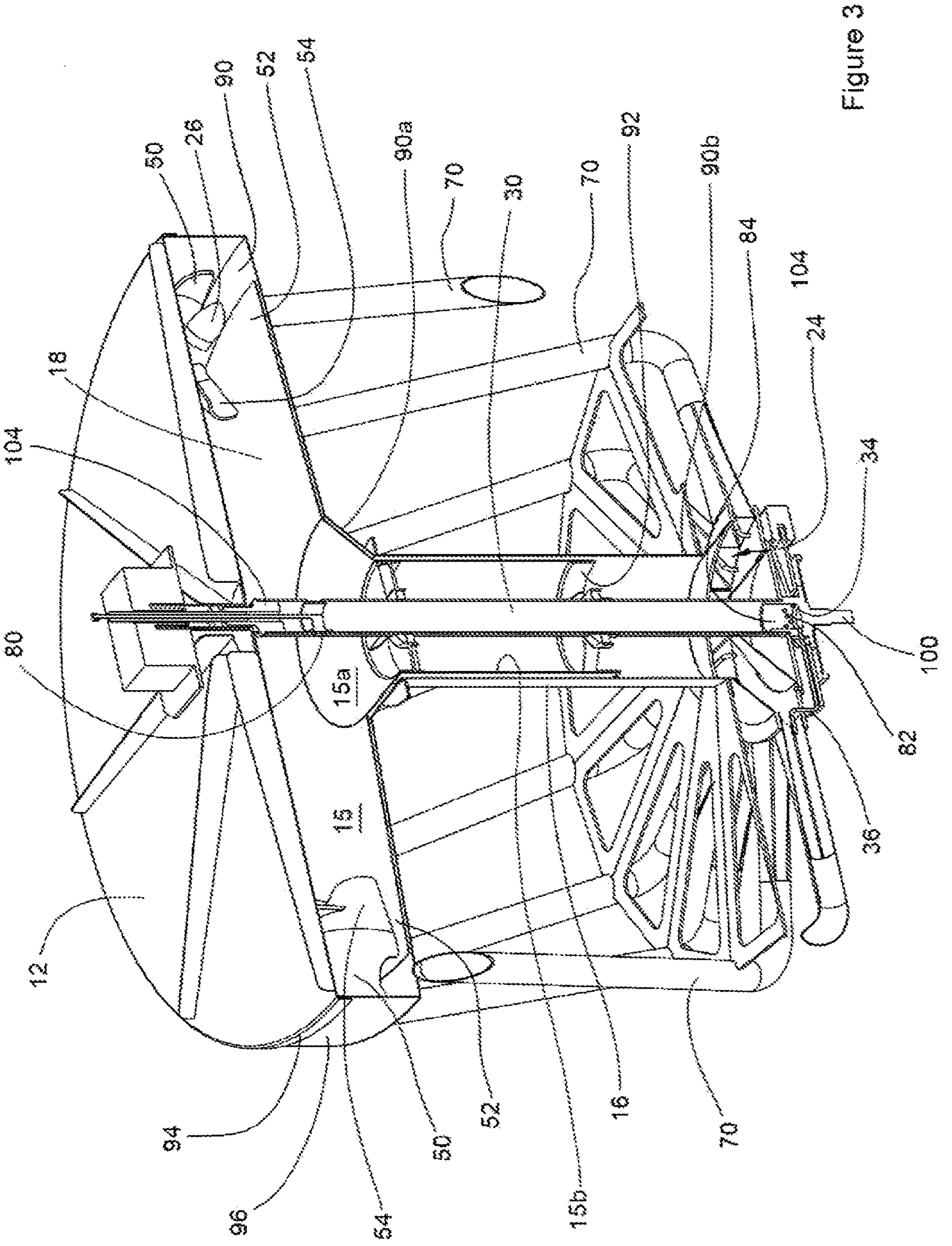
FIGS. 3 and 4 are section views from above and from the side (respectively) of the impulse turbine of the first embodiment.
Figure 4:
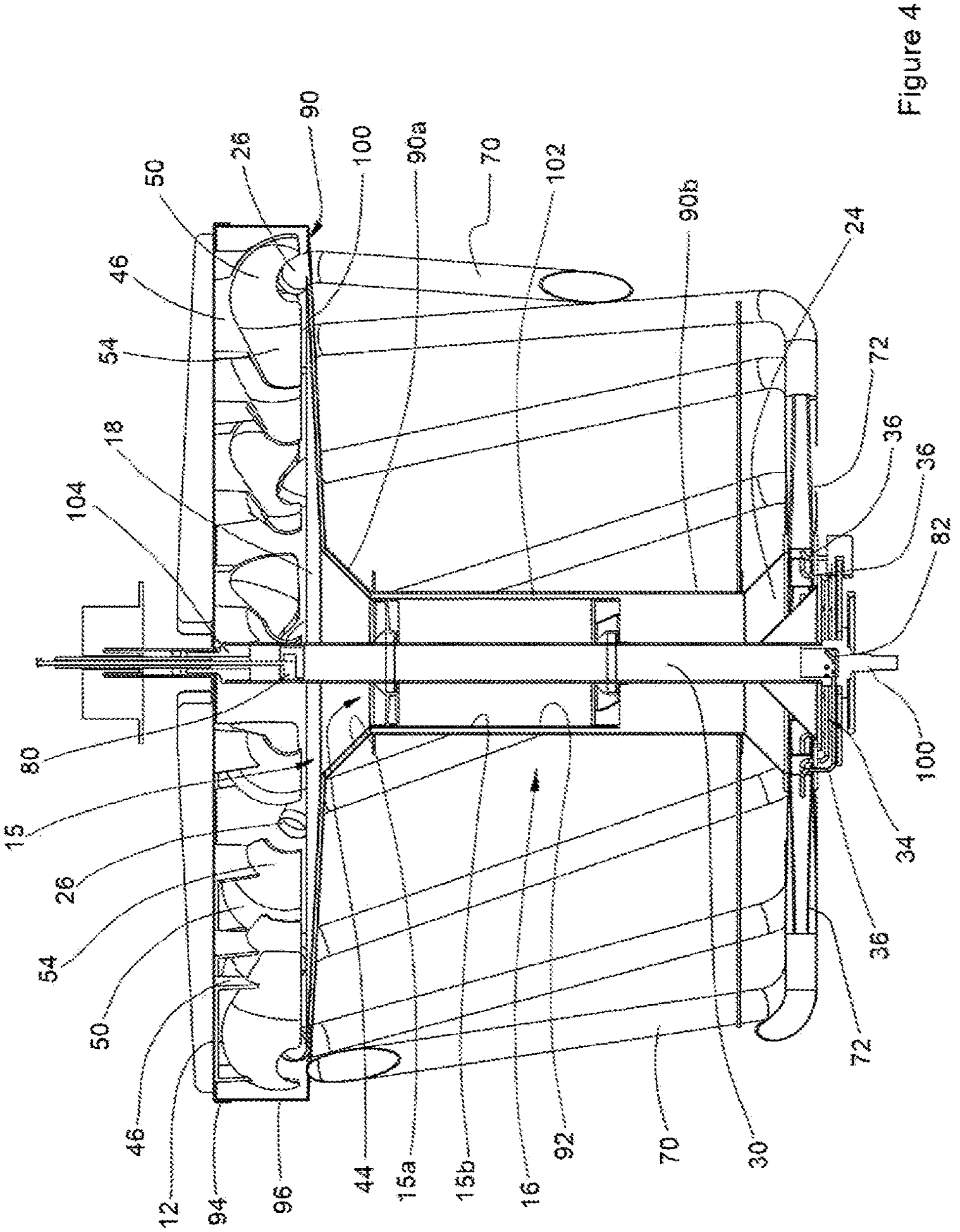
Figure 5:
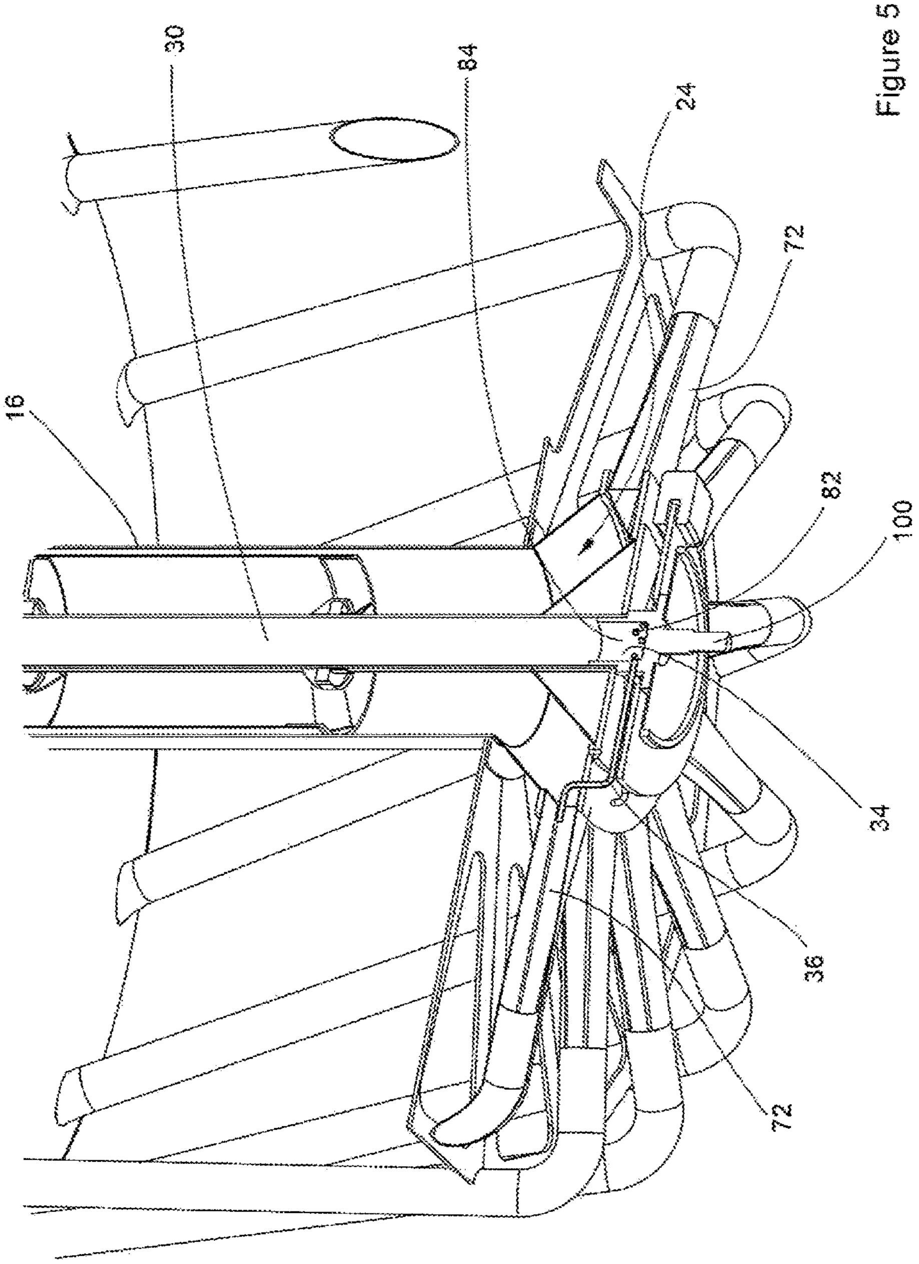
FIG. 5 is a close-up section view from below better showing the lower end of the drive assembly of the first embodiment of the impulse turbine.

A description of the draft tube 16 and the elements in this embodiment that make up the draft tube 16 will now be provided, with particular regard to FIGS. 3 to 5. In this embodiment, two portions 15*a* and 15*b* of the draft tube 16 are integrally formed with the collector plate 15, extending vertically therebelow such that the generally horizontal upper surface 18 of the collector plate 15 and the draft tube 16 together have a funnel-shaped upper portion 15*a* at the inlet 44 to the draft tube 16, and such that the draft tube 16 is in fluid communication with the upper surface 18. Fluid on the upper surface 18 thus flows by way of gravity from the upper surface 18 to the centre of the collector plate 15, through the inlet 44 and down the upper portion 15*a* through the interior of a mid-portion 15*b* of the draft tube 16. As is evident in FIG. 4, the upper surface 18 thus includes a slight inwardly directed incline to permit and direct flow of fluid off that upper surface 18 towards and down the draft tube 16.

The central draft tube 16 in this embodiment is a tube of constant diameter, with the inlet 44 having the upper portion 15*a* (the shoulder region) between the upper surface 18 of the collector plate 15 and the mid-portion 15*b* of the draft tube 16.

It can also be seen in in FIGS. 3 and 4 that the outlet nozzles 26 are provided integrally with a nozzle plate 90 that extends below the collector plate 15, and then via lower portions 90*a* and 90*b* down and outside the upper portion 15*a* and the mid-portion 15*b* of the draft tube 16 in a snug fit but such that there can be relative rotation between the nozzle plate 90, 90*a*, 90*b* and the collector plate 15, 15*a*, 15*b*. With this in mind, it will be noted that in this embodiment there remains a gap 102 between the collector plate 15 and the nozzle plate 90, with an inlet at the point marked by the reference numeral 100, which will permit the passage of any fluid inadvertently flowing outwardly past the outlet nozzles 26 back down through the gap 102 and back into the draft tube 16.

The collector plate 15, including its upper and mid-portions 15*a* and 15*b*, all float in the manner described above, whereas the nozzle plate 90, including its lower portions 90*a* and 90*b*, will rotate during operation by virtue of the forced rotation of the outlet nozzles 26. In this respect, in this embodiment the lowermost portion 90*b* of the nozzle plate 90 extends at its lower end below the mid-portion 15*b* of the collector plate 15 and down to the inlet 24 of the drive assembly 22 and its tubes 70, and thus forms a lower element of the draft tube 16.

It will be appreciated that with drive cups 20 and the drive plate 12 both being static, and the outlet nozzles 26 and the nozzle plate 90 thus rotating during use, so too will the upstanding side wall 96 of the nozzle plate 90. However, a suitable sealing engagement will be provided between the corner flange 94 of the drive plate 12 to permit relative rotation between the drive plate 12 and the sidewall 96 of the nozzle plate 90

The drive cups 20 in this embodiment are attached to the underside of the drive plate 12 by any suitable means, such as bolts or by welding, and in this embodiment include a mounting flange 46 for securing the drive cups 20 to the drive plate 12. Because the recirculating fluid comes from below the collector plate 15, the drive cups 20 include a fluid-jet engaging portion 50 (evident in FIGS. 1*c*, 3 and 4) that extends outwardly beyond the periphery 52 of the collector plate 15, together with a fluid return portion 54 that returns fluid to the upper surface 18 of the collector plate 15. In this form, with outlet nozzles 26 positioned tangentially below and also outside the periphery 52 of the collector plate 15, the fluid jets (not shown) are able to first engage with the fluid-jet engaging portions 50 of the static drive cups 20, with the fluid then passing across the engaging portions 50 via the fluid return portions 54 to be transferred to the upper surface 18 of the collector plate 15.

In this embodiment, the drive cups 20 are configured such that fluid jets are deflected through 160° to 170°, with the high velocity fluid jets impinging upon the fluid-jet engaging portions 50 of the drive cups 20 and the direction of the water changing to follow the contour of the fluid return portions 54. The impulse energy of the water exerts torque on the drive cups 20 and thus provides the relative rotation between the drive cups 20 and the outlet nozzles 26, by causing the outlet nozzles 26 and thus the drive assembly 22 to rotate. The fluid then changes direction and exits the drive cups 20 onto the upper surface 18 of the collector plate 15 with low velocity.

In relation to the drive assembly 22 of the impulse turbine of the present invention, the drive assembly 22 is preferably configured and arranged to be generally about the central draft tube 16, generally below the upper surface 18 of the collector plate 15, with a fluid inlet 24 at the lower end of the drive assembly 22, in fluid communication with the lower end of the draft tube 16, and the plurality of tangentially arranged outlet nozzles 26 configured at its upper end.

Figure 2A:
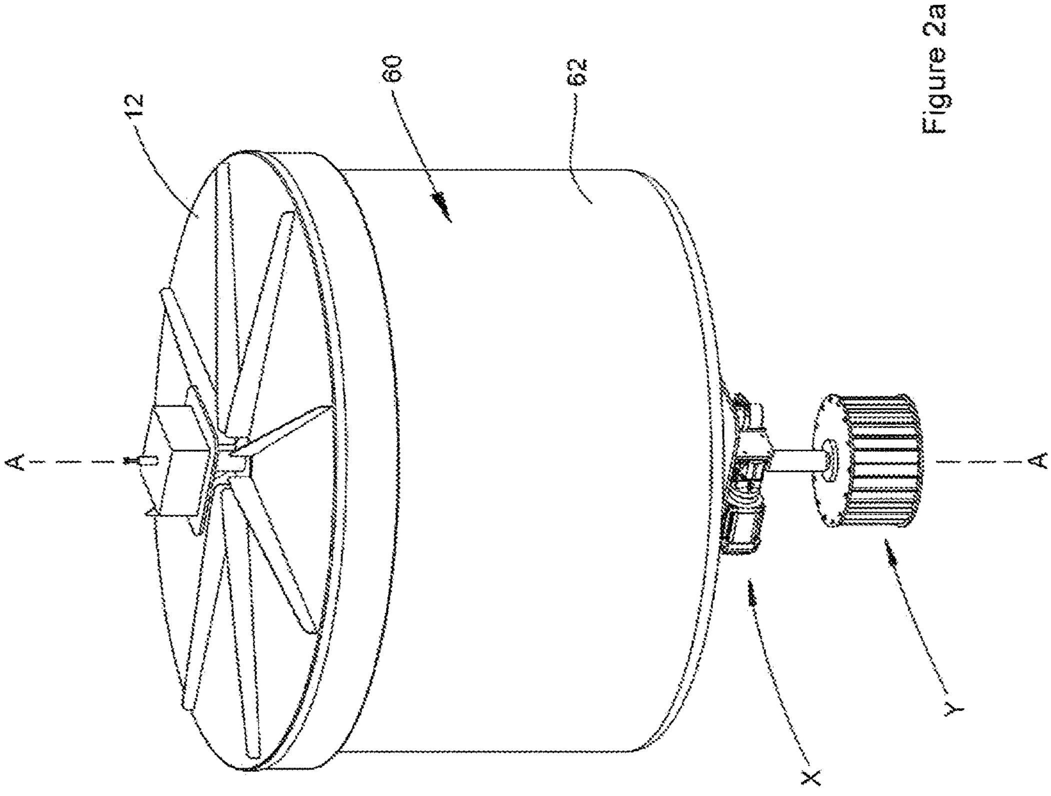
FIGS. 2*a* and 2*b* are schematic isometric views of second and third embodiments of the impulse turbine.

As mentioned above, and as will now be discussed in relation to the embodiments illustrated in FIGS. 1*a* to 1*d*, 3 and 4 (the first embodiment), and then in FIG. 2*a* (the second embodiment) and FIG. 2*b* (the third embodiment), the drive assembly 22 may for instance be a cylindrical drum 60 in FIG. 2*a*, rotatable about its central, vertical axis A, with the interior (not shown) of its sidewall 62 being a smooth surface, the sidewall 62 being inclined slightly away from the vertical axis A of the drum 60, across which fluid from the drum's lower fluid inlet will flow to exit through a plurality of the peripherally arranged outlet nozzles 26 (shown in earlier Figures) about the upper end of the drum 60. In this form, the drum's lower fluid inlet will include one or more lower nozzles (not shown) configured and/or directed so as to guide the flow of fluid away from the lower fluid inlet, up the interior of the sidewall of the drum 60, in a direction that is tangentially inclined to the sidewall of the drum.

Figure 2B:
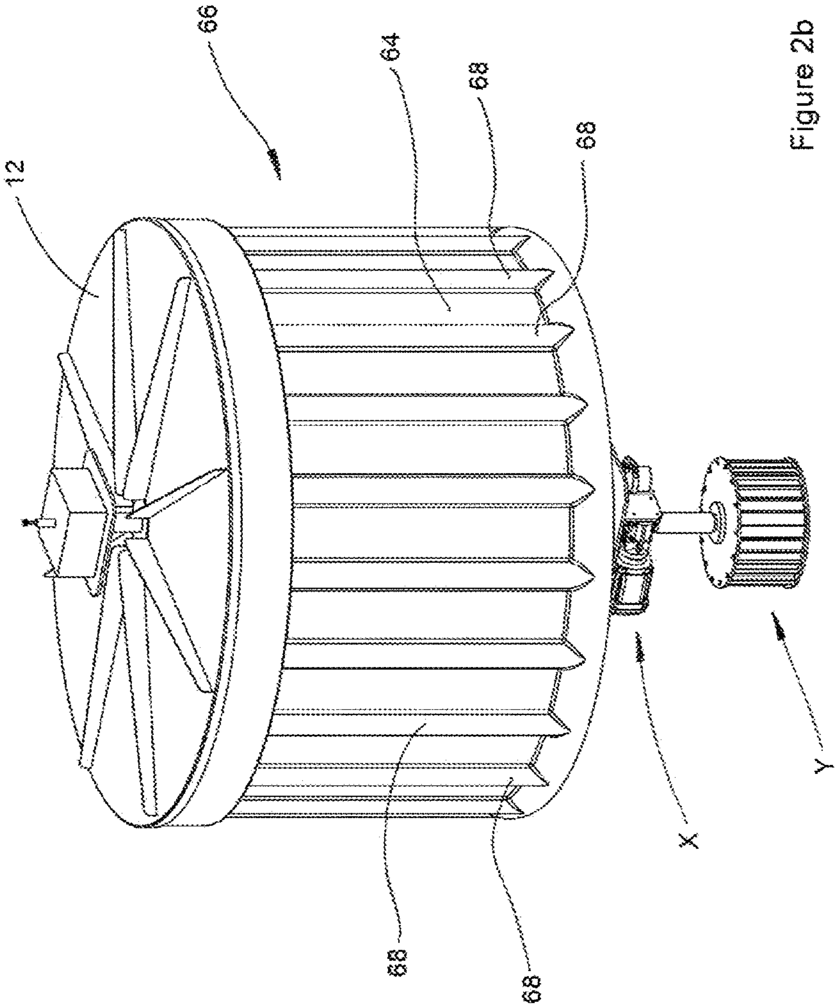

Alternatively, and with reference to FIG. 2*b*, the sidewall 64 of a cylindrical drum 66 may be configured with flow channels 68, each of which align with a specific outlet nozzle 26 (shown earlier in the Figures), to provide guided flow of the fluid from the lower fluid inlet of the drum 66 to the upper outlet nozzles 26. In this form, the fluid inlet of the drum may again include a lower fluid distribution manifold (not shown) that distributes fluid from the fluid inlet to the lower end of each of the flow channels 68, again to provide guided flow of the fluid.

However, in the first embodiment illustrated in FIGS. 1*a* to 1*d*, 3 and 4, the flow channels that provide such a guided flow of fluid are closed flow channels in the form of tubes 70, without the need for a solid walled drum, where the tubes 70 essentially form a cage of tubes about the central draft tube 16 of the collector plate 15, with each tube 70 aligning with a specific upper outlet nozzle 26, to provide guided flow of the fluid from the lower fluid inlet 24 to the upper outlet nozzles 26. In this embodiment, the fluid inlet of such an assembly includes a lower fluid distribution manifold that distributes fluid from the fluid inlet 24 to the lower end 72 (two such lower ends 72 referenced in FIG. 4) of each of the tubes 70, again to provide guided flow of the fluid to respective upper outlet nozzles 26.

Furthermore, such tubes 70 are configured so as to be vertically inclined from the vertical axis A of the drive assembly 22 (and thus of the collector plate 15) and also tangentially inclined in the same manner as outlined above, resulting in a generally helical array of tubes forming the cage-like drive assembly 22 of the first embodiment.

It will thus be apparent that the fluid flow in all embodiments from the lower inlet 24 to the upper outlet nozzles 26 of the drive assembly 22 will be upward and generally helical, due to the dual inclinations away from the vertical axis of the collector plate 15 and tangentially to the outer periphery 52 of the collector plate 15. These dual inclinations assist with the movement of the fluid from the lower end 72 of the tubes 70 upwardly to the outlet nozzles 26, with the fluid jets formed at the outlet nozzles 26 engaging with the drive cups 20 to generate the relative rotation referred to above.

Referring now to FIGS. 3 to 5, the central draft tube 16 includes therewithin a central air tube 30 with an upper air inlet in the form of a plurality of apertures 80 and a lower air distribution manifold 34. The lower air distribution manifold 34 includes multiple venturi outlets 36 capable of entraining air in the fluid to assist movement of the fluid from the lower end of the drive assembly 22 upwardly to the outlet nozzles 26. In this embodiment, the lower air distribution manifold 34 includes a respective venturi outlet 36 for each of the tubes 70 of the drive assembly 22.

Evident at the upper end of the central air tube 30 in FIG. 4 is a hollow axle shaft through which an actuating rod passes from a speed governing mechanism (not shown) into the central air tube 30. The actuating rod is connected to an internal air control piston 104 which controls the amount of air entering the central air tube 30 by opening or closing over the inlet apertures 80, thereby effectively controlling the airflow by effectively increasing or reducing the area available for the flow of air into the central air tube 30 in response to the need to increase or decrease the rotational speed of the drive assembly 22.

With respect to the flow of air into and through the impulse turbine 10, air will be drawn down the central air tube 30 from immediately above the upper surface 18 of the collector plate 15 through the apertures 80 (see FIG. 1*c*) located at a level just below the collector plate 15, where air entrained in the circulating fluid will be escaping from the circulating fluid. In this embodiment, there will also be an air release valve, which is ideally a passive vent to allow internal and external air pressures to equalize, but also minimises loss of fluid from the system.

The air entering the air tube 30 travels downwardly from the apertures 80 to the lower air distribution manifold 34 that includes a series of radial ports 82 (one for each venturi outlet) to which is attached a venturi tube 36 that extends from the central air tube wall 84 to a location within a respective tube 70, with its outlet facing downstream to the flow so as to create a venturi through which air is entrained into the fluid as the fluid enters a tube 70.

After exiting the venturi outlets 36, the air will be compressed in the fluid in the tubes 70, with the air expanding after peak compression and on its exit from the venturi outlets 36 so as to pressurise the fluid to increase the velocity of the fluid up the tubes 70 and form an adjustable velocity. As the fluid travels away from the point of peak compression, air entrained within the fluid begins expanding rapidly, and ejects the fluid from the outlet nozzles 26 at a much greater velocity than that of un-entrained fluid.

In this form, this 'de-compressing' fluid exits the outlet nozzles 26 and is impacted into the static drive cups 50 at the periphery of the drive plate 12 and transfers the energy (as thrust) from the fluid to the rotating drive tube assembly 22, therefore providing continuous rotational drive to the entire drive tube assembly 22 and rotation of the drive shaft 100 for the production of useful work.

In conclusion, it must be appreciated that there may be other variations and modifications to the configurations described herein which are also within the scope of the present invention.

The invention claimed is:

1. A recirculating hydro-pneumatic impulse turbine, the recirculating hydro-pneumatic impulse turbine including:

a collector assembly including a central draft tube extending therebelow, the collector assembly including a collector plate having a generally horizontal upper surface and being configured such that the central draft tube is in fluid communication with the generally horizontal upper surface, there also being a series of peripherally arranged drive cups about the generally horizontal upper surface;

a drive assembly about the central draft tube, the drive assembly including a fluid inlet at its lower end in fluid communication with the lower end of the central draft tube, and a plurality of tangentially arranged outlet nozzles configured at its upper end;

a central air tube with an upper air inlet and a lower air distribution manifold, the lower air distribution manifold including at least one venturi outlet;

wherein, during use, fluid jets that form at the plurality of tangentially arranged outlet nozzles engage with the series of peripherally arranged drive cups to generate relative rotation between the plurality of tangentially arranged outlet nozzles and the series of peripherally arranged drive cups about a vertical axis, with fluid subsequently flowing from the series of peripherally arranged drive cups across the generally horizontal upper surface of the collector plate to the central draft tube, down the central draft tube where the fluid enters the fluid inlet of the drive assembly for recirculation to the plurality of tangentially arranged outlet nozzles.

2. The recirculating hydro-pneumatic impulse turbine according to claim 1, wherein the plurality of tangentially arranged outlet nozzles rotate and interact with the series of peripherally arranged drive cups, or the plurality of tangentially arranged outlet nozzles rotate and the drive cups also rotate but in opposite directions.

3. The recirculating hydro-pneumatic impulse turbine according to claim 1, wherein the outlet nozzles rotate and interact with static drive cups.

4. The recirculating hydro-pneumatic impulse turbine according to claim 3, wherein the collector assembly includes a static upper drive plate, spaced above the collector plate, such that the series of peripherally arranged drive cups are integral with or secured to the underside of the static upper drive plate, arranged about the periphery thereof, to extend downwardly towards the collector plate to be immediately above, but not in contact with, the collector plate.

5. The recirculating hydro-pneumatic impulse turbine according to claim 4, wherein the series of peripherally arranged drive cups are integrally formed with the static upper drive plate, such that static upper drive plate and the series of peripherally arranged drive cups form a single element, or the series of peripherally arranged drive cups are removably or permanently attached to the static upper drive plate.

6. The recirculating hydro-pneumatic impulse turbine according to claim 4, wherein the collector plate is a floating plate, mounted for rotation.

7. The recirculating hydro-pneumatic impulse turbine according to claim 4, wherein the plurality of tangentially arranged outlet nozzles lie outside the periphery of the collector plate and rotate about the periphery of the collector plate.

8. The recirculating hydro-pneumatic impulse turbine according to claim 7, wherein the static upper drive plate is configured to extend beyond the periphery of the collector plate such that the series of peripherally arranged drive cups also extend out beyond the periphery of the collector plate.

9. The recirculating hydro-pneumatic impulse turbine according to claim 4, wherein the central draft tube is integrally formed with the collector plate, extending vertically therebelow such that the upper surface and the central draft tube together have a funnel-shaped configuration, and such that the central draft tube is in fluid communication with the generally horizontal upper surface.

10. The recirculating hydro-pneumatic impulse turbine according to claim 9, wherein the central draft tube is a constant diameter tube with a transitional region between the generally horizontal upper surface of the collector plate and an upper portion of the central draft tube.

11. The recirculating hydro-pneumatic impulse turbine according to claim 9, wherein two portions of the central draft tube, an upper portion and mid-portion, are integrally formed with the collector plate, extending vertically therebelow such that the generally horizontal upper surface of the collector plate and the central draft tube together have the funnel-shaped configuration.

12. The recirculating hydro-pneumatic impulse turbine according to claim 11, wherein the upper air inlet of the central draft tube includes the upper portion, which is a shoulder region between the upper surface of the collector plate and the mid-portion of the central draft tube.

13. The recirculating hydro-pneumatic impulse turbine according to claim 11, wherein the plurality of tangentially arranged outlet nozzles are provided integrally with a nozzle plate that extends below the collector plate, down and outside the upper portion and the mid-portion of the central draft tube in a snug fit but such that there can be relative rotation between the nozzle plate and the collector plate.

14. The recirculating hydro-pneumatic impulse turbine according to claim 13, wherein the collector plate and the upper and mid-portions of the central draft tube all float, whereas the nozzle plate extends at its lower end below the mid-portion of the central draft tube down to the fluid inlet of the drive assembly and will rotate during operation by virtue of the forced rotation of the plurality of tangentially arranged outlet nozzles.

15. The recirculating hydro-pneumatic impulse turbine according to claim 13, wherein the nozzle plate includes an upstanding side wall having a sealing engagement between a corner flange of the static drive plate to permit relative rotation between the drive plate and the upstanding sidewall of the nozzle plate.

16. The recirculating hydro-pneumatic impulse turbine according to claim 1, wherein the plurality of tangentially arranged outlet nozzles are positioned tangentially to the periphery of the collector plate and outside the periphery of the collector plate.

17. The recirculating hydro-pneumatic impulse turbine according to claim 1, wherein the series of peripherally arranged drive cups include a fluid-jet engaging portion that extends outwardly beyond the periphery of the collector plate, together with a fluid return portion that returns fluid to the upper surface of the collector plate.

18. The recirculating hydro-pneumatic impulse turbine according to claim 1, wherein the series of peripherally arranged drive cups are configured such that the fluid jets formed at the plurality of tangentially arranged outlet nozzles are deflected through 160° to 170°, with the fluid jets formed at the plurality of tangentially arranged outlet nozzles impinging upon fluid-jet engaging portions of the series of peripherally arranged drive cups and the direction of the water changing to follow the contour of the series of peripherally arranged drive cups.

19. The recirculating hydro-pneumatic impulse turbine according to claim 1, wherein the drive assembly is arranged to be below the generally horizontal upper surface of the collector plate.

20. The recirculating hydro-pneumatic impulse turbine according to claim 1, wherein the drive assembly is a cylindrical drum with a single perimetric sidewall that has an interior surface, the drum being rotatable about its central, vertical axis, with the interior surface being a smooth surface across which fluid from the fluid inlet moves to exit through the plurality of tangentially arranged outlet nozzles arranged about an upper end of the drum.

21. The recirculating hydro-pneumatic impulse turbine according to claim 20, wherein the interior surface of the drum is configured with flow channels, each of which align with a specific outlet nozzle of the plurality of tangentially arranged outlet nozzles, to provide guided flow of fluid from the fluid to the plurality of tangentially arranged outlet nozzles.

22. The recirculating hydro-pneumatic impulse turbine according to claim 21, wherein the drive assembly includes a lower fluid distribution manifold that distributes fluid from the fluid inlet to the lower end of each flow channel to provide guided flow of the fluid.

23. The recirculating hydro-pneumatic impulse turbine according to claim 22, wherein the flow channels are tubes, either formed integrally with the interior of the drum, or rigidly secured to the interior of the drum.

24. The recirculating hydro-pneumatic impulse turbine according to claim 1, wherein the drive assembly is a cage of tubes about the central draft tube, with each tube in the cage of tubes aligning with a specific outlet nozzle of the plurality of tangentially arranged outlet nozzles, to provide guided flow of the fluid from the fluid inlet to the plurality of tangentially arranged outlet nozzles.

25. The recirculating hydro-pneumatic impulse turbine according to claim 24, wherein the drive assembly has lower fluid distribution manifold that distributes fluid from the fluid inlet to each tube in the cage of tubes.

26. The recirculating hydro-pneumatic impulse turbine according to claim 25, wherein each tube in the cage of tubes is configured to be vertically inclined from the vertical axis of the drive assembly and also tangentially inclined with respect to the periphery of the collector plate, resulting in a helical array of tubes.

27. The recirculating hydro-pneumatic impulse turbine according to claim 24, wherein fluid flow from the fluid inlet to the plurality of tangentially arranged outlet nozzles of the drive assembly is upward and helical.

28. The recirculating hydro-pneumatic impulse turbine according to claim 1, wherein the upper air inlet of the central air tube is associated with an air release valve, the air release valve being a passive vent to allow internal and external air pressures to equalize.

29. The recirculating hydro-pneumatic impulse turbine according to claim 28, wherein the central air tube includes a plurality of inlet apertures located below the collector plate, such that air entering the central air tube travels downwardly from those openings to the lower air distribution manifold that includes a series of radial ports, being one for each venturi tube, such venturi tubes extending from the central air tube wall to a location associated with, and in close proximity to, or within, a flow channel, with its outlet facing downstream to the flow.

* * * * *